UNITED STATES PATENT OFFICE.

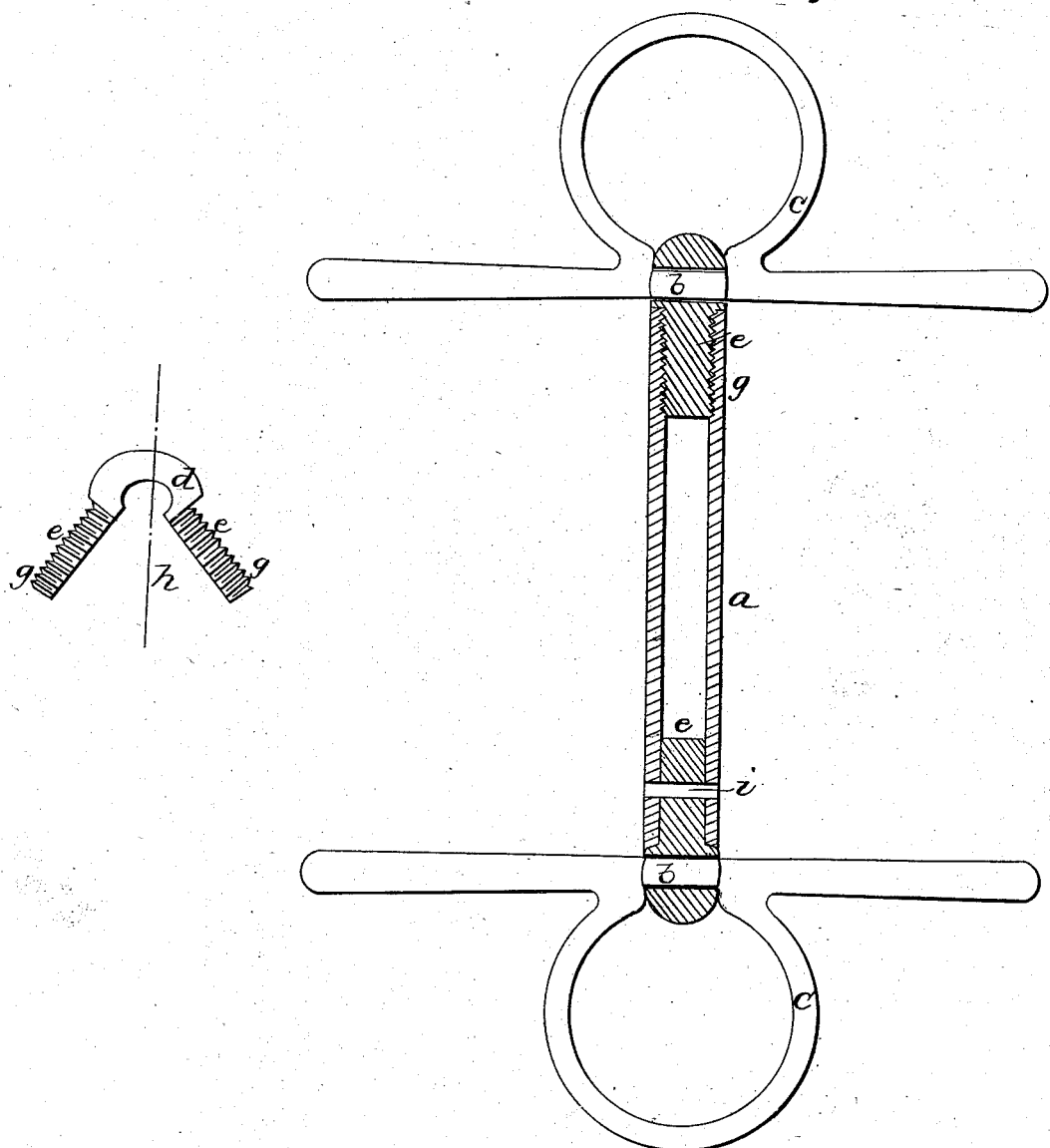

STEPHEN D. ARNOLD, OF NEW BRITAIN, CONNECTICUT, ASSIGNOR TO HIMSELF AND W. F. ARNOLD, OF SAME PLACE.

IMPROVED BRIDLE-BIT.

Specification forming part of Letters Patent No. 56,872, dated August 7, 1866.

*To all whom it may concern:*

Be it known that I, STEPHEN D. ARNOLD, of New Britain, county of Hartford, and State of Connecticut, have invented certain new and useful Improvements in Bridle-Bits; and to enable others skilled in the art to make and use the same, I will proceed to describe its construction, by referring to the drawings, in which the same letters indicate like parts in each of the figures.

The nature of this improvement consists in making the bit proper hollow, so that its increased size will not materially add to its weight; also, in making the clasp (in which the ring or bit appendage is secured) partially open, so as to receive said ring, &c., after which it is closed up and fitted into the end of said bit-tube, either by screwing the shank of the clasp therein or by means of a pin or rivets passing through both the tube and shank, thereby rendering it lighter and more convenient for packing, and by its use the animal may be more easily managed.

In the accompanying drawings, $a$ is the bit proper, made of tubing of any desirable size. $c$ is a ring appendage, having a depression or fulcrum, $b$, which is closed into the clasp. $d$ is a clasp, the shank of which is made open, more or less, so as to receive the depression or fulcrum $b$. $e$ are shanks of the clasp, which, after they have been closed together, have a screw-thread, $g$, cut thereon, so as to allow it to be turned or screwed into a corresponding thread cut in the end of the bit-tube $a$; or they may be fitted closely into the end of the bit-tube and secured therein by a pin or screw, $i$.

The clasp may also be made in two distinct parts, as indicated by the line $h$, and then put together, and when properly secured into the bit-tube will firmly hold the ring or appendages in their place.

By the use of this improvement it is believed that the animal can be more easily controlled, the article more easily and cheaply made, and is more conveniently and compactly put up for market.

I believe I have thus shown the nature, construction, and advantage of this improvement, so as to enable others skilled to make and use the same therefrom.

What I claim, therefore, and desire to secure by Letters Patent, is—

The combination of the tube-bit $a$ with the clasp $d$ and ring $c$, constructed and arranged substantially as and for the purpose described.

STEPHEN D. ARNOLD. [L. S.]

Witnesses:
 E. W. BLISS,
 J. W. BLISS.